United States Patent [19]
Birt et al.

[11] 4,189,529
[45] Feb. 19, 1980

[54] HIGH TEMPERATURE SECONDARY CELLS

[75] Inventors: Denis C. P. Birt; Colin R. Feltham; Graham Hazzard, all of Bournemouth; Leonard J. Pearce, Broadstone, all of England

[73] Assignee: National Research Development Corporation, London, England

[21] Appl. No.: 889,085

[22] Filed: Mar. 22, 1978

[30] Foreign Application Priority Data

Mar. 24, 1977 [GB] United Kingdom ............... 12464/77

[51] Int. Cl.² .......................................... H01M 4/36
[52] U.S. Cl. .................................... 429/103; 429/112
[58] Field of Search ............... 429/102, 103, 112, 140

[56] References Cited
U.S. PATENT DOCUMENTS

| | | | |
|---|---|---|---|
| 3,663,295 | 5/1972 | Baker | 429/102 |
| 3,915,742 | 10/1975 | Battles | 429/102 |
| 4,013,818 | 3/1977 | Askew et al. | 429/112 |
| 4,060,667 | 11/1977 | Askew et al. | 429/103 |

*Primary Examiner*—Charles F. LeFevour
*Attorney, Agent, or Firm*—Pollock, Vande Sande and Priddy

[57] ABSTRACT

A high temperature secondary cell of pelletized construction contained within a close fitting inert tube. Anode active material is lithium. Cathode active material is an iron sulphide or titanium disulphide. Electrolyte is a mixture of lithium halides. The cell is bounded by separator plates extending beyond the inner peripheral surface of the inert tube.

20 Claims, 3 Drawing Figures

HIGH TEMPERATURE SECONDARY CELLS

This invention relates to high temperature secondary cells, and more particularly to high temperature/high energy density secondary batteries.

U.S. Pat. Nos. 4,013,818 and 4,060,667 disclose a high temperature secondary battery of pelletized construction, in one embodiment of which a stack of pelletized cells is enclosed in a close fitting tube of material which is electrically insulating at the battery operating temperature and chemically inert to the cell materials. Lithium and lithium-aluminum alloys are disclosed as anode (negative electrode) materials, lithium halides as electrolyte, iron sulphides and titanium disulphide as cathode (positive electrode) materials, and lithium fluoride as tube material.

Throughout this specification the negative electrode will be called the anode, and the positive electrode called the cathode, irrespective of whether the cell is charging or discharging.

The present invention provides a high temperature secondary cell having an anode pellet comprising a lithium alloy and an alkali halide electrolyte material including a lithium halide, an electrolyte pellet comprising said alkali halide electrolyte material and an inert immobilizer, and a cathode pellet comprising said alkali halide electrolyte material and either an iron sulphide or titanium disulphide, the pellets being arranged in a close fitting electrically insulating inert tube, and the cell being bounded at each end by a respective electrical contact plate for the adjacent electrode pellet the electrical contact plates extending beyond the inner peripheral surface of the tube. The inert tube may be of magnesia, or boron nitride, or and is preferably compacted to in excess of 90% of theoretical density.

The iron sulphide may be iron disulphide.

The anode pellet and/or the cathode pellet may include powdered magnesia or boron nitride as an immobilizer. This is not essential however when active materials of fine particle size are used (<75 μM).

Preferably the lithium alloy is a lithium-aluminum alloy and comprises 20 wt% lithium and 80 wt% aluminum and the anode pellet comprises 60–90 wt% alloy the balance being electrolyte material. Preferably the anode pellet is compressed to 60–90% of theoretical density. Lithium-silicon alloy is an alternative lithium alloy.

The electrolyte pellet may include 60–70 wt% of powdered magnesia or boron nitride immobilizer. The pellet is preferably compressed to 60–70% of theoretical density. The preferred electrolyte material is a mixture of lithium fluoride, lithium chloride and lithium bromide.

The cathode pellet preferably comprises 60–70 wt% of an iron sulphide and a balance of the electrolyte material. The pellet is preferably compressed to 55–75% of theoretical density.

The electrical contact plates are preferably of molybdenum.

The present invention also provides a high temperature secondary battery comprising a stack of at least two cells as described above, the cells of the stack being separated by common or contacting electrical contact plates.

An embodiment of the invention will now be described, by way of example only, with reference to the drawings accompanying the specification, in which.

Figure 1:
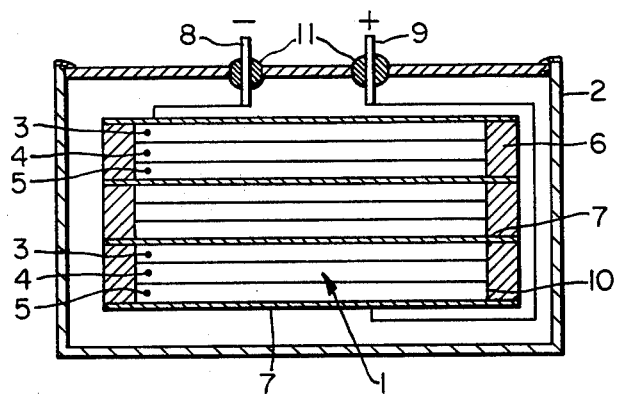
FIG. 1 is a sectional view of a high temperature battery in accordance with the invention.

In FIG. 1 a high temperature battery having three cells 1 is shown. The cells 1 are arranged in a single stack and enclosed within a mild steel case 2. Each cell 1 comprises an anode pellet 3, an electrolyte pellet 4, a cathode pellet 5, a short close fitting inert tube 6, and electrical conductor plates 7. A single common conductor plate 7 is placed between adjacent cells 1 of the stack to connect them electrically in series and also to seal the cells and prevent chemical reaction between the cells. Similar conductor plates 7 are placed at the top and bottom of the stack and are connected to battery terminals 8 and 9. All conductor plates 7 extend beyond the inner periphery 10 of the tubes 6 so that they are trapped between adjacent tubes 6 when the stack is assembled. This ensures that a good seal is made between the conductor plates 7 and the tubes 6. The conductor plates are of molybdenum. When the stack of cells 1 is assembled within the case 2 and enclosed, it is lightly compressed by means not shown to ensure good electrical connection and good sealing between cells. This light compaction can be provided by extra tubes 6 used as spacers or by suitable design of the case 2.

The anode pellets 3 are produced from a powedered 20 wt% lithium-80 wt% aluminum alloy and an alkali halide electrolyte material including a lithium halide. A suitable mixture is 70 wt% alloy to 30 wt% electrolyte material. The anode pellet 3 is made by compacting the mixture to between 80 and 90% of theoretical density.

The electrolyte pellets 4 are produced from the same electrolyte material as used in the anode pellet 3. A suitable electrolyte material comprises 10 wt% lithium fluoride, 22 wt% lithium chloride, and 68 wt% lithium bromide. This electrolyte material is immobilizer by admixture with magnesia powder in the proportions 30 wt% electrolyte material and 70 wt% magnesia. The electrolyte pellet 4 is compressed to 60–70% of theoretical density.

The cathode pellets 5 are produced from one of the following in admixture with the electrolyte material: iron sulphide, iron disulphide, titanium disulphide. A suitable mixture is 70 wt% iron sulphide, 30 wt% electrolyte material. The cathode pellet 5 is compressed to between 60 and 70% of theoretical density.

The electrode and electrolyte pellets are prepared by conventional cold pressing of the powdered constituents.

The inert tubes 6 are made of magnesia which is compressed to approximately 95% of theoretical density to minimize absorption of electrolyte material. It is also possible to include an inert immobilizer such as magnesia or boron nitride in both the anode pellet 3 and cathode pellet 5 but it has been found that when these pellets are prepared from fine powder (particle size <75 μM) constituents, additional immobilizers are not required.

It will be seen that the cathode pellet 5 and the electrolyte pellet 4 are more lightly compacted than the anode pellet 3. During the discharge cycle of the cells 1 lithium passes from the anode to the cathode so lessening the density of the former. Effectively both electrode pellets have some degree of porosity which can accommodate volumetric changes that take place during charge and discharge. Also the immobilization of the electrolyte in magnesia reduces the difficulties of electrolyte containment when the battery is in use, the electrolyte being paste-like when hot. Thus the battery can be made without resource to gasket compression seals with their associated materials problems. The battery case 2 is hermetically sealed and electrical teminals 8 and 9 to the battery are provided through glass insulators 11. The operating temperature of the battery is in the range 400°-550° C. and the heat required to raise the battery to this temperature is supplied externally.

Figure 2:
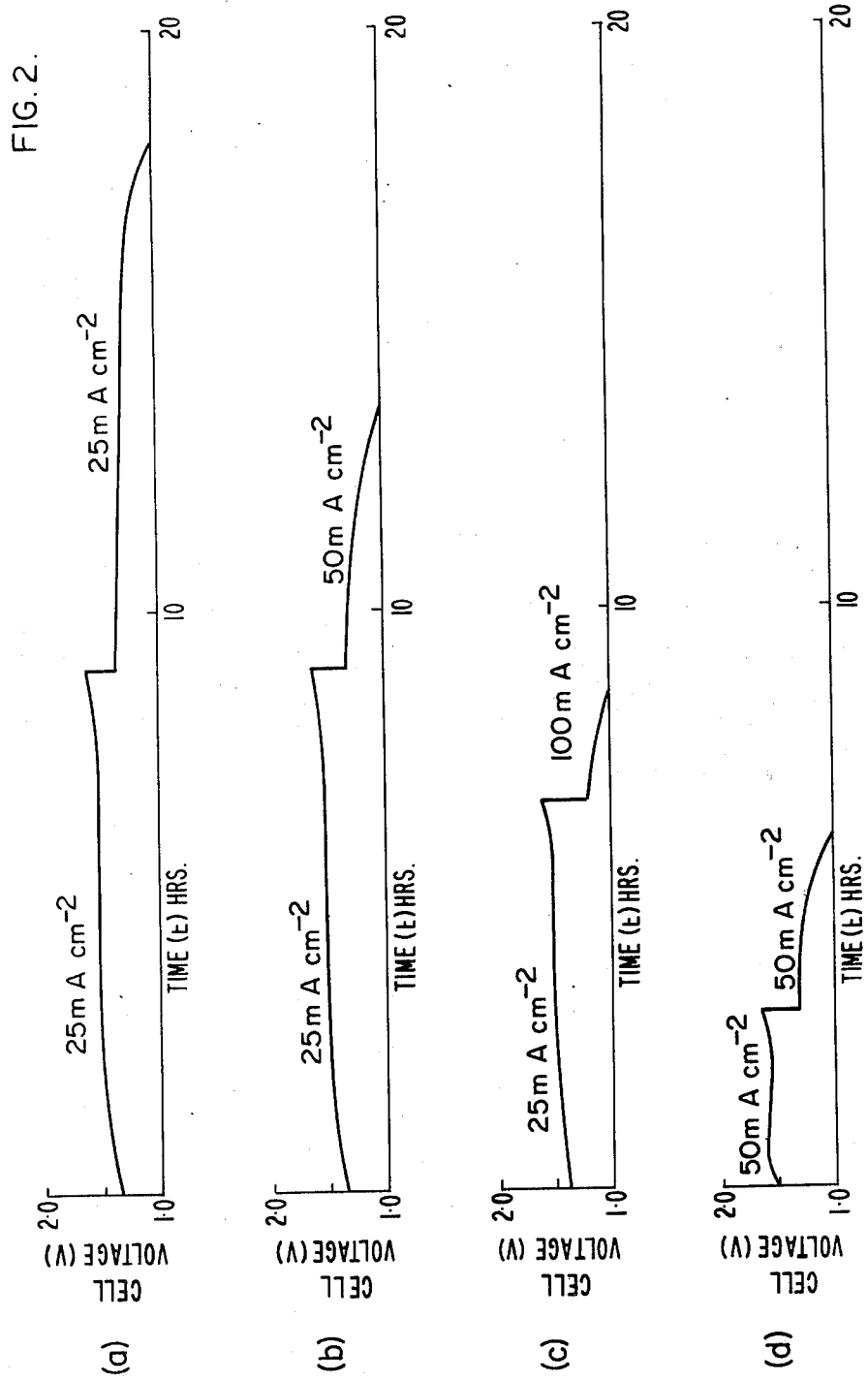
FIG. 2 shows charge/discharge curves for the battery of FIG. 1 at different current densities.

FIG. 2 shows charge/discharge cycles of a single cell of the form and composition described, between fixed voltage limits and current densities varying between 25 mA.cm$^{-2}$ to 100 mA.cm$^{-2}$. The capacity of the electrodes in this cell was selected to demonstrate the cell's capability for duties such as traction or bulk energy storage. The energy density, taking the weight of only the pellets into account is approximately 200 Wh.Kg$^{-1}$. The energy efficiency at the nine hour rate is approximately 85% for the 25 mA.cm$^{-2}$ current density and 80% and 75% respectively for the 50 mA.cm$^{-2}$ and 100 mA.cm$^{-2}$ densities. The lower utilization at the 100 mA.cm$^{-2}$ discharge and 50 mA.cm$^{-2}$ charge and discharge rates result from operating the cell between fixed voltage limits.

Figure 3:
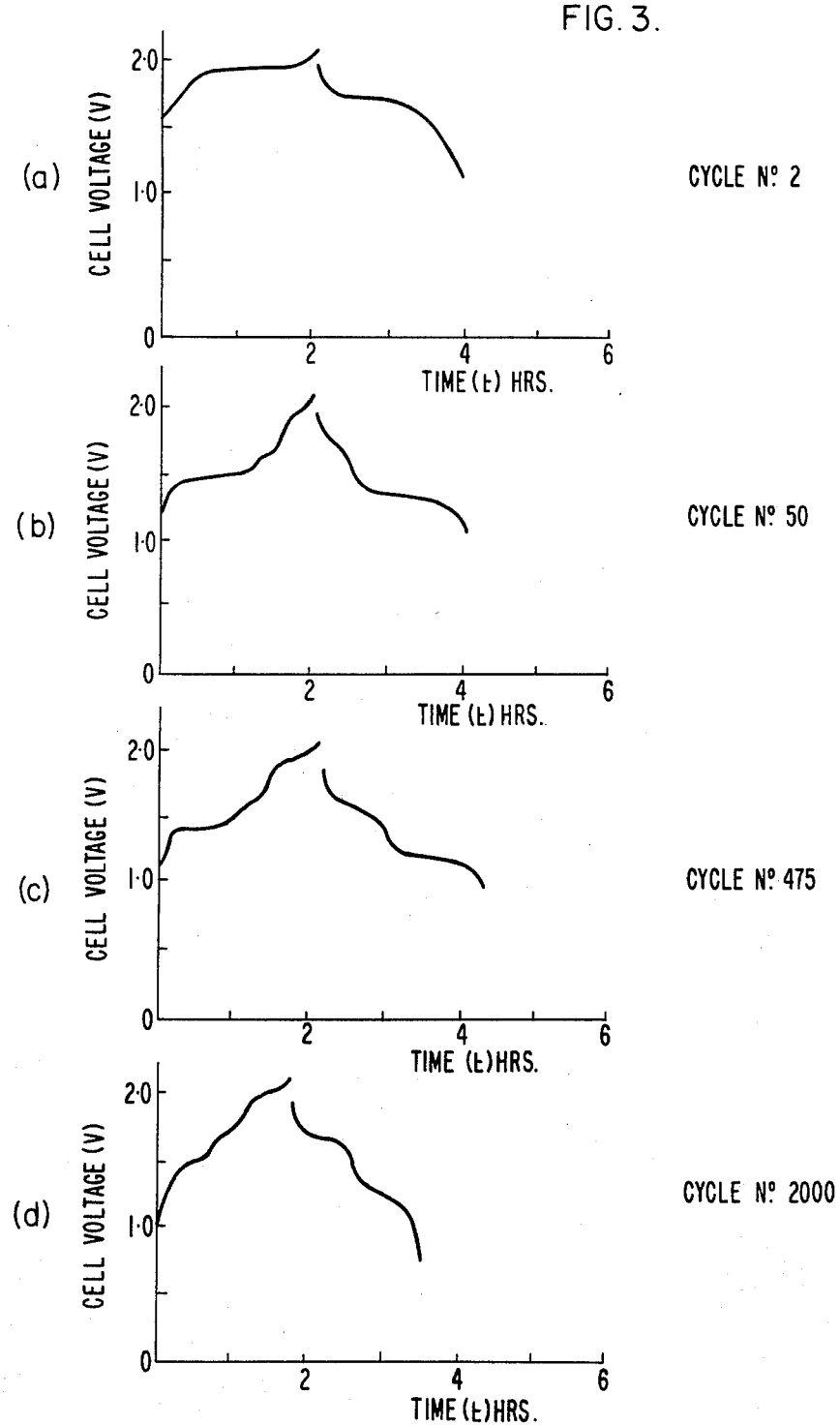
FIG. 3 shows the effect of repeated charge/discharge cycles on the charge/discharge curve for a constant current density.

In FIG. 3, the effect of repeated charge and discharge cycles on a cell is shown. This cell was of similar construction to that described above but had an iron disulphide cathode. Both anode and cathode pellets contained electrolyte material having approximately 70 wt% of magnesia immobilizer.

The battery described above is by way of example only and should not be taken as a limitation of the scope of the invention. Many variations are possible within the invention as defined in the apparent claims.

We claim:

1. A high temperature secondary cell having:
   a. an anode pellet comprising a lithium alloy and an alkali halide electrolyte material including a lithium halide;
   b. an electrolyte pellet comprising said alkali halide electrolyte material and an inert immobilizer selected from the group consisting of magnesia and boron nitride:
   c. a cathode pellet comprising said alkali halide electrolyte material and an active material selected from the group consisting of iron sulphide, iron disulphide and titanium disulphide;
   d. an electrically insulating, inert tube within which the above-mentioned pellets are arranged, the inert tube fitting closely around said pellets; and
   e. a respective electrical contact plate for each electrode pellet, said contact plates bounding the cell at each end and extending beyond the inner peripheral surface of the inert tube.

2. A high temperature secondary cell as claimed in claim 1 in which at least one of the anode pellet and the cathode pellet contains an inert immobilizer selected from the group consisting of magnesia and boron nitride.

3. A high temperature secondary cell as claimed in claim 1 in which said lithium alloy is a 20 wt% lithium/80 wt% aluminum alloy, and in which the anode pellet consists of 60-90 wt% of this alloy, the balance being said electrolyte material.

4. A high temperature secondary cell as claimed in claim 3 in which the anode pellet is compressed to between 60 and 90% of theoretical density.

5. A high temperature secondary cell as claimed in claim 4 in which said inert tube is of material selected from the group consisting of magnesia and boron nitride.

6. A high temperature secondary cell as claimed in claim 5 in which the electrical contact plates are of molybdenum.

7. A high temperature secondary cell as claimed in claim 1 in which the cathode pellet comprises 60 to 70 wt% of iron sulphide or iron disulphide, and the balance of said electrolyte material.

8. A high temperature secondary cell as claimed in claim 7 in which said cathode pellet is compressed to between 55 and 75% of its theoretical density.

9. A high temperature secondary cell as claimed in claim 8 in which said inert tube is of a material selected from the group consisting of magnesia and boron nitride.

10. A high temperature secondary cell as claimed in claim 9 in which the electrical contact plates are of molybdenum.

11. A high temperature secondary cell as claimed in claim 1 in which the inert tube is of a material selected from the group consisting of magnesia and born nitride.

12. A high temperature secondary cell as claimed in claim 1 in which said alkali halide electrolyte material comprises a mixture of lithium fluoride, lithium chloride and lithium bromide.

13. A high temperature secondary cell as claimed in claim 12 in which the electrolyte pellet contains 60-70 wt% of an immobilizer selected from the group consisting of magnesia and boron nitride; the balance being electrolyte material.

14. A high temperature secondary cell as claimed in claim 13 in which the electrolyte pellet is compressed to 60-70% of theoretical density.

15. A high temperature secondary cell as claimed in claim 14 in which the inert tube is of a material selected from the group consisting of magnesia and boron nitride.

16. A high temperature secondary cell as claimed in claim 15 in which the cathode pellet comprises 60-70 wt% of iron sulphide or iron disulphide, and the balance of said electrolyte material.

17. A high temperature secondary cell as claimed in claim 16 in which the lithium alloy is a 20 wt% lithium/80 wt% aluminum alloy, and in which the anode pellet consists of 60-90 wt% of this alloy, the balance being said electrolyte material.

18. A high temperature secondary cell as claimed in claim 17 in which the cathode pellet comprises 60-70 wt% of iron sulphide or iron disulphide, and the balance of said electrolyte material.

19. A high temperature secondary cell as claimed in claim 18 in which the electrical contact plates are of molybdenum.

20. A high temperature secondary battery comprising a plurality of cells each cell having:
   a. an anode pellet comprising a lithium aluminum alloy and an electrolyte material which is a mixture of lithium fluoride, lithium chloride and lithium bromide;
   b. an electrolyte pellet comprising said electrolyte material and an inert immobilizer selected from the group consisting of magnesia and boron nitride;

c. a cathode pellet comprising said electrolyte material and an active material selected from the group consisting of iron sulphide, iron disulphide and titanium disulphide;

d. an electrically insulating, inert tube within which the above-mentioned pellets are arranged, the inert tube fitting closely around said pellets; and e. an electrical contact plate bounding the cell at one end thereof and extending beyond the inner peripheral surface of the inert tube: wherein the cells are arranged in a least one stack in which the cells are connected in series by the electrical contact plates.

* * * * *